US010002398B1

(12) United States Patent
Isaacson

(10) Patent No.: US 10,002,398 B1
(45) Date of Patent: Jun. 19, 2018

(54) SYSTEM FOR FACILITATING REAL ESTATE TRANSACTION

(71) Applicant: Jilla Gila Isaacson, Beverly Hills, CA (US)

(72) Inventor: Jilla Gila Isaacson, Beverly Hills, CA (US)

( * ) Notice: Subject to any disclaimer, the term of this patent is extended or adjusted under 35 U.S.C. 154(b) by 0 days. days.

(21) Appl. No.: 15/717,706

(22) Filed: Sep. 27, 2017

(51) Int. Cl.
| | |
|---|---|
| *G06Q 30/00* | (2012.01) |
| *G06Q 50/16* | (2012.01) |
| *G06Q 50/18* | (2012.01) |
| *G06Q 30/06* | (2012.01) |
| *G06T 11/60* | (2006.01) |
| *G06T 13/80* | (2011.01) |
| *G06T 11/00* | (2006.01) |

(52) U.S. Cl.
CPC ......... *G06Q 50/16* (2013.01); *G06Q 30/0613* (2013.01); *G06Q 50/188* (2013.01); *G06T 11/001* (2013.01); *G06T 11/60* (2013.01); *G06T 13/80* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | | |
|---|---|---|---|
| 8,433,650 B1* | 4/2013 | Thomas | G06Q 10/06 705/35 |
| 2002/0010608 A1* | 1/2002 | Faber | G06Q 10/0631 705/26.1 |
| 2006/0003813 A1* | 1/2006 | Seligmann | H04M 1/57 455/567 |

OTHER PUBLICATIONS

"BuyerCurious.com[R] Announces Launch of AgentSmart" (Business Wire, Dec. 17, 2012) https://dialog.proquest.com/professional/docview/1239224330?accountid=142257 (Year: 2012).*

* cited by examiner

*Primary Examiner* — Ethan D Civan
(74) *Attorney, Agent, or Firm* — Adli Law Group P.C.; Chen Huang

(57) ABSTRACT

The present disclosure relates to a system that facilitates real estate transactions by preventing listing agents from eliminating standing offers. In one embodiment, the system comprises a non-transitory computer-readable storage device including instructions, which when executed by a processor of the computing device, cause the computing device to receive selling information of a real estate from a seller or the seller's agent from a website or a mobile application, display the selling information to the plurality of users who enter search information that matches the real estate via the website or the mobile application, receive an offer from a buyer or the buyer's agent via the website or the mobile application, send a notification to the seller and seller's agent instantly and simultaneously about the offer through the website or the mobile application or both, and receive acceptance for the offer or a counteroffer from the seller or seller's agent or buyer and buyer's agent.

18 Claims, 26 Drawing Sheets

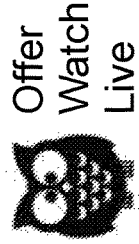
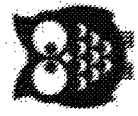
Fig. 2

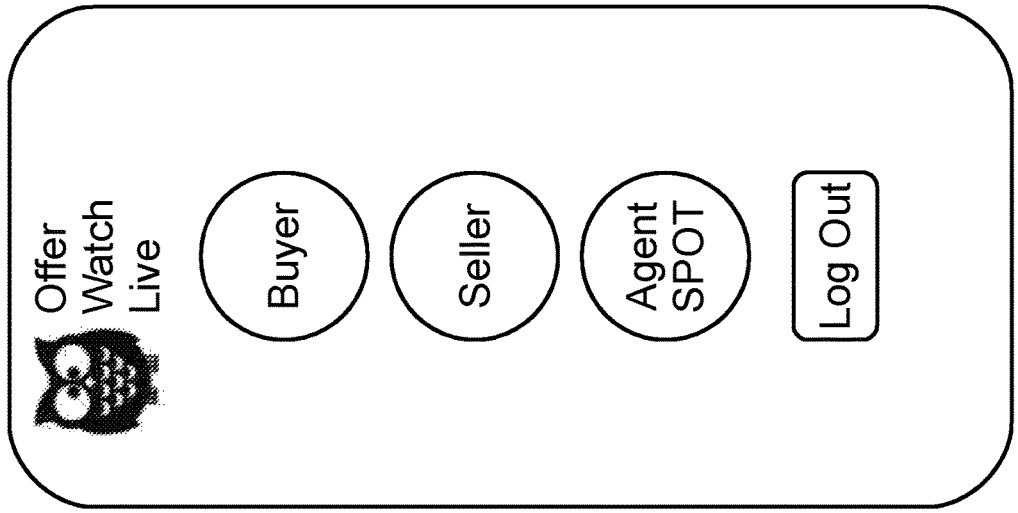
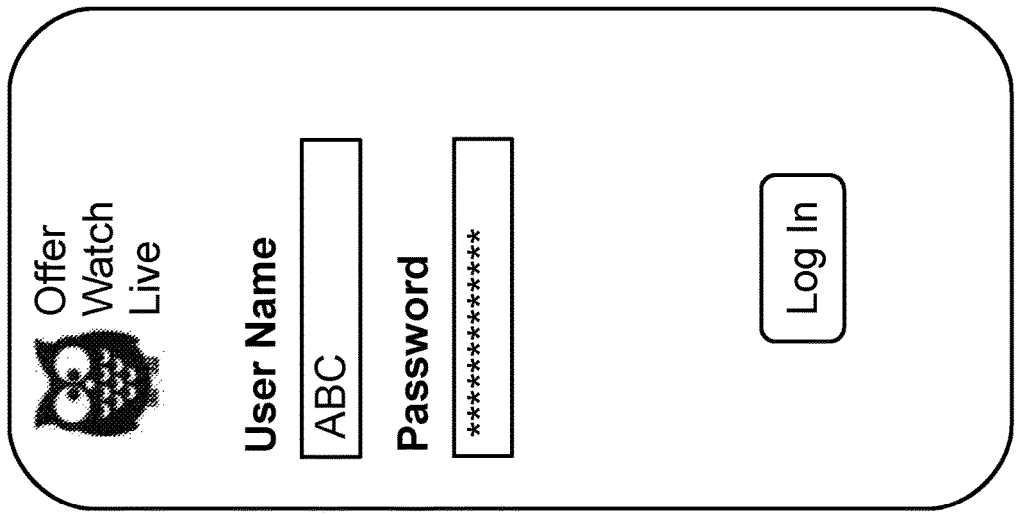
Fig. 3

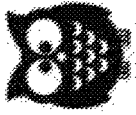
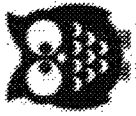
Fig. 5

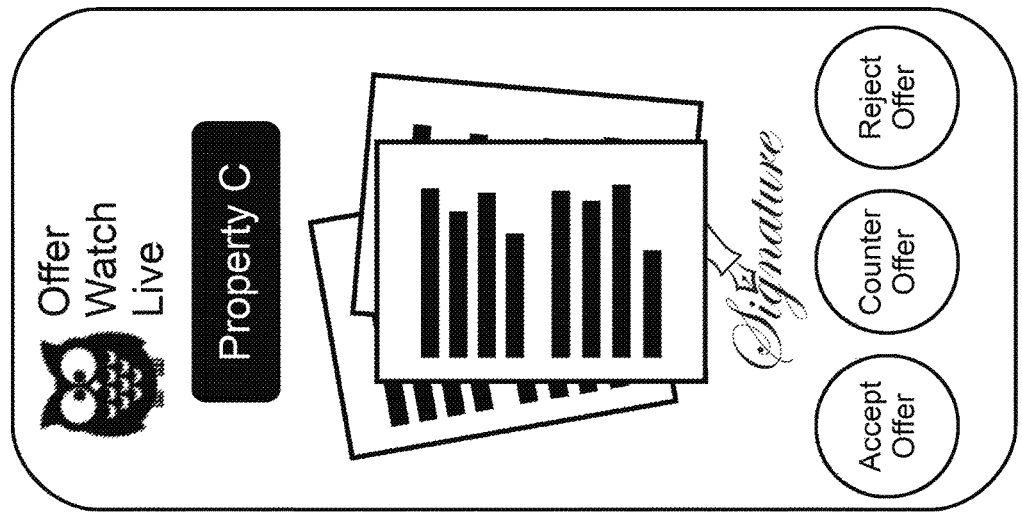
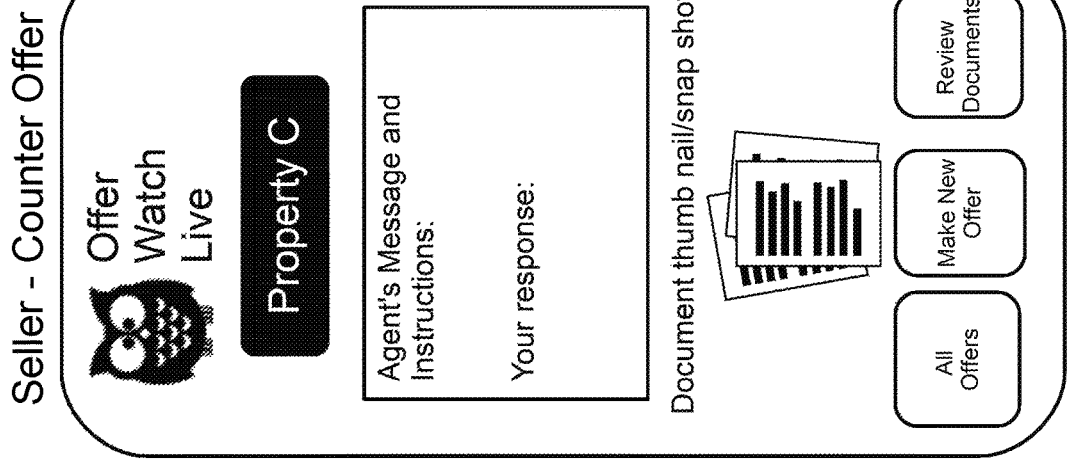
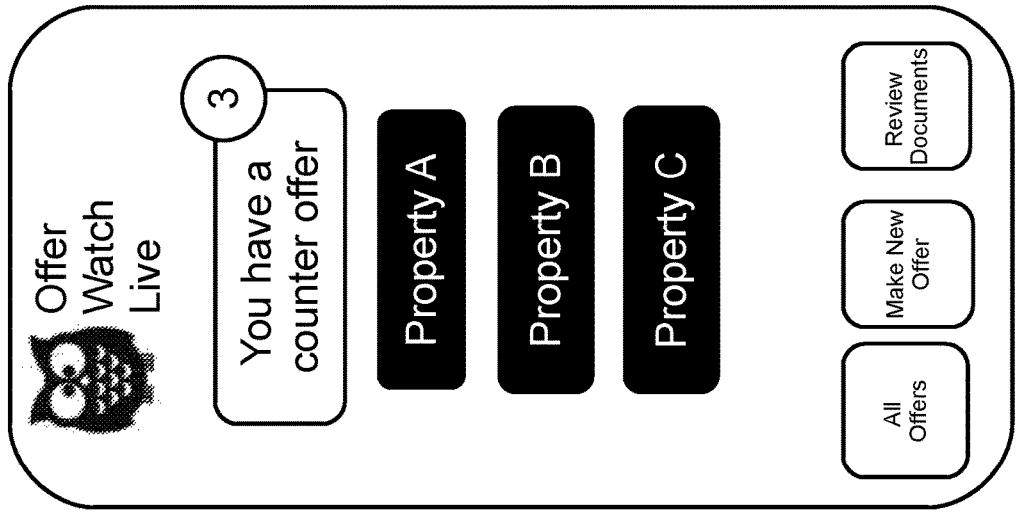
Fig. 7

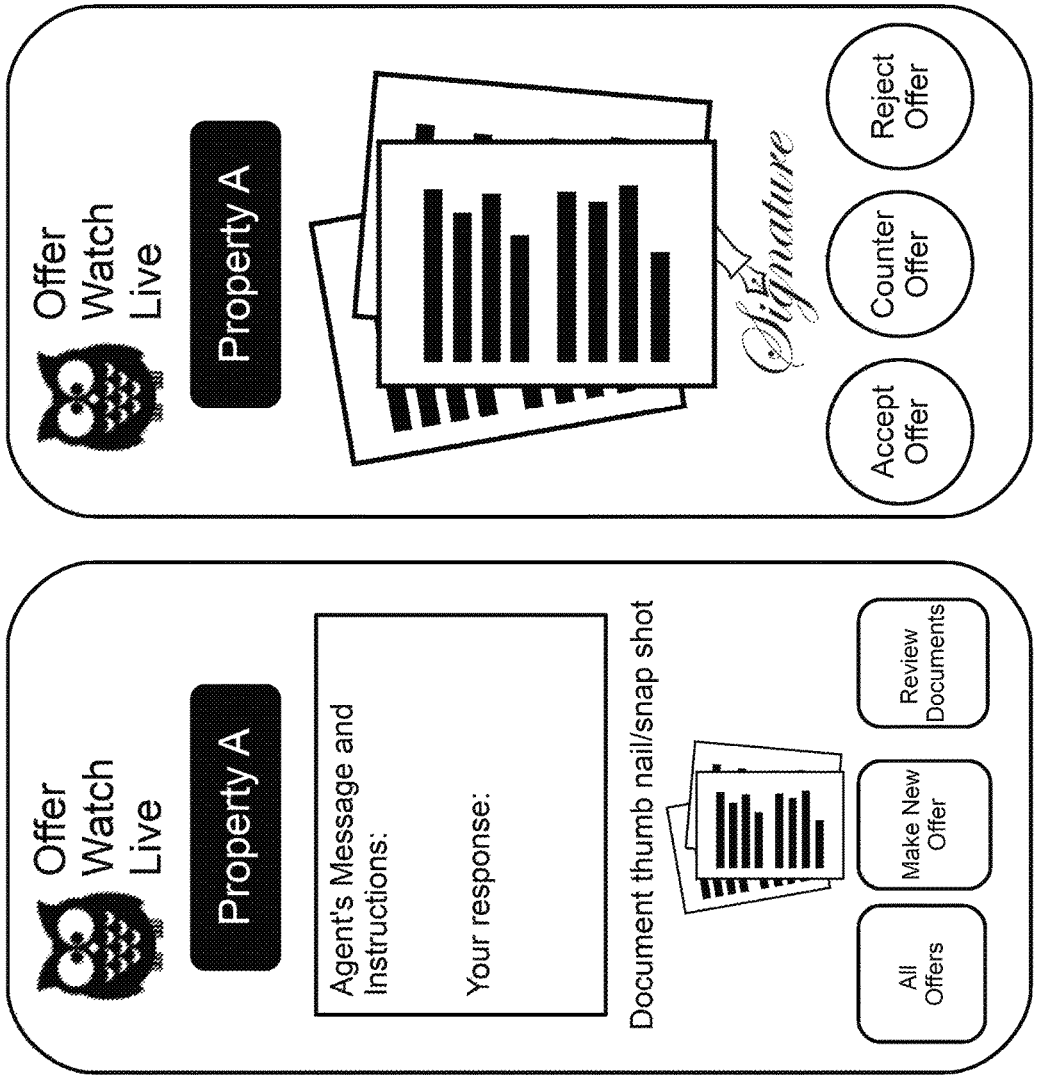
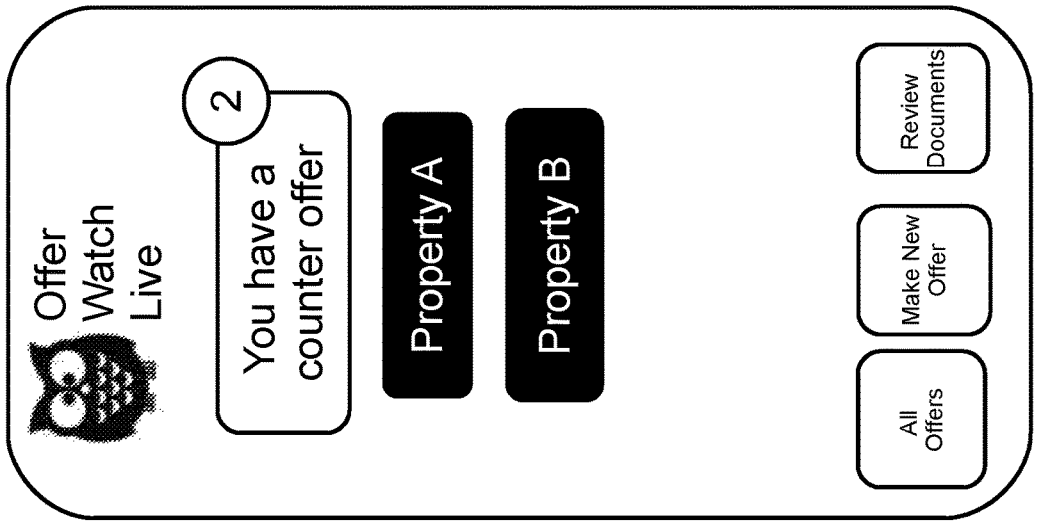
Fig. 13

SYSTEM FOR FACILITATING REAL ESTATE TRANSACTION

FIELD OF THE DISCLOSURES

The present disclosure generally relates to a system or platform for real estate transaction. More specifically, the present disclosure provides a system that facilitates real estate transactions by preventing listing agents from eliminating standing offers. Moreover, in a real estate partnership agreement the goal is for all partners to be aware of all standing offers on the partnership properties which are to be listed for sale. The real estate transactions include, but are not limited to, commercial and residential leases and purchases.

BACKGROUND OF THE INVENTION

Often, it is the case that, listing brokers for real estates would pursue and present incoming offers, that best serve their personal gains and would literally ignore other potential and viable offers. Many buyers of properties have found discrimination and bias, when their offers were not made through the sellers' listing agents. Accordingly, there exists a need for an improved system and platform that facilitates real estate transaction by making sure that the listing agents do not eliminate a standing offer to serve their own interests and personal gains. Also in many partnership real estate transactions, often the general manager or an executive member handles all incoming offers, in case of a sale. Through the present disclosure, there can be a provision as part of the operating agreement, or any other contract instruments among partners, whereby all partners can be notified and made aware of all incoming offers.

SUMMARY OF THE INVENTION

The present disclosure solves this situation by implementing a system, whereby all offers are dictated by the seller to go through a designated website and/or mobile application. This is done by means of, tagging property listings in different sites, with a specially designed logo. The logo is indicative of the fact that seller will only consider offers that are initiated through the designated website and/or mobile application.

In one embodiment, the logo can be touched, in which case the buyers can open the mobile application, register if not yet, and initiate negotiations through series of notifications, actions and counter-actions, based on those notifications. Listing agents should also be able to tag their properties directly through the designated website or mobile application, and through different listing websites (e.g., Zillow®). Buyers and sellers do not have to necessarily register, since their agents are those who have to use the app. All notifications are sent through email to all parties, as well as in app notifications which are received by all registered.

The system in the present disclosure is intended for sellers to be informed of all the offers and/or interests in their property (Single Family Residential, Multi-family Residential, Multi-family Commercial Mix-used, Commercials, Strip Center Commercial, Shopping Center Commercial, Office Building), in real time. On the same token, the app facilitates interested buyers, to make sure that the seller is aware of their interest and upcoming offer.

The goal of the system is to make seller to only look at offers that are generated through the designated website and/or mobile application, and to make buyers to show more interest in properties that uses the designated website and/or mobile application from the disclosed system, since they feel more confident that their offers will be represented and looked at by sellers. The disclosed system also gives users the ability to connect in real time, through Live Chat and Instant Messaging which could also include video chatting, that will automatically open up when necessary. User interface and ease of use has been a priority throughout the design of the present disclosure. This is specifically addressed through intricate color coding of stages, functions and statuses. Further, a map is provided that shows all those registered with the system, within a local area as relating to each user, similarly color coded, based on the function or type of users. The map also displays all properties tagged with a specified logo or mark within a geographic area. For example, "Offer Watch Live" or "OWL" can be used as a logo and in a shape of a real or cartoon animated owl bird which also is abbreviation for the name of the disclosed mobile application. The OWL can be used as a messenger and also as the logo for the disclosed app itself.

The map can be filtered by several options available to users. Such as, but not limited to, buyers only, sellers only, agents only, escrow companies, contractors, lawyers and/or a specified combination dictated by users. Users can choose to communicate with other users, by clicking on their nodes on the map. Through the map, as all registered service providers are color tagged on the map, when a node is touched on the map, the node's information (Photo, name, address, email, phone number) will be displayed on a pop up window, where options for Live Instant Messaging is provided in the pop up. An in-app notification can also be sent to the node. For instance, this might be someone who has just purchased a home, and looking for contractors who are shown by a specific color tag on the map. By clicking a specific node, buyer can get all the contact information and open a Live Chat message box, to start communicating.

As today's social interconnections and business transactions are becoming more and more electronic, it would be inevitable that property sellers and buyers can ultimately be connected and would be able to interact electronically, more efficiently and in real time. Although the ultimate goal would be for buyers and sellers to be able to do business without the use of brokers and agents, many may not be comfortable to enter such major transactions without the expertise of a property broker. The present disclosure facilitates this transition from a conventional way of property transactions to a more efficient and up to date way, based on today's social and business transactions. The present disclosure is an intricate system that brings all parties in a property transaction, namely, seller, buyer, agents, escrow officer, inspectors, loan officers (first and second), loan agents, mortgage broker, bank financiers, contractors and title company, together, and connected through series of notifications and triggered actions based on the nature of each notification. Also, there is a Live Chat messaging between all corresponding parties, when processing negotiations and examining financials, and dealing with other types of services. Further, through a color-coded map, all subjects in a real estate transaction and services, can be accessed and be communicated with, through this Live Chat/messaging system. Ultimately sellers and buyers can contact each other live, directly without help from agents, if they choose to.

These and other features, aspects and advantages of the present invention will become better understood with reference to the following drawings, description and claims.

BRIEF DESCRIPTION OF THE DRAWINGS

FIG. 2 is a schematic diagram according to an exemplary embodiment of the present invention.

FIG. 3 is a schematic diagram according to an exemplary embodiment of the present invention.

FIG. 5 is a schematic diagram according to an exemplary embodiment of the present invention.

FIG. 7 is a schematic diagram according to an exemplary embodiment of the present invention.

FIG. 13 is a schematic diagram according to an exemplary embodiment of the present invention.

DETAILED DESCRIPTION OF THE PREFERRED EMBODIMENT(S) AND INVENTION

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

For purpose of present disclosure, the term "real estate transaction" includes all types of transactions that are related to real estate. For instance, it may include, but not limited to, residential/commercial purchases, residential/commercial leasing and contract for deed etc. Thus, the term "offer" and "counteroffer" used in the present disclosure also includes offers/counteroffers in all types of real estate transaction (e.g., offer/counteroffer for leases). While embodiments below use seller and buyer in a purchasing negotiation to illustrate the present disclosure, it should be noted that they can be substituted with other roles in different real estate transactions, such as lessee and leaser in a leasing negotiation, all of which should be construed as part of the present disclosure.

Figure 1:
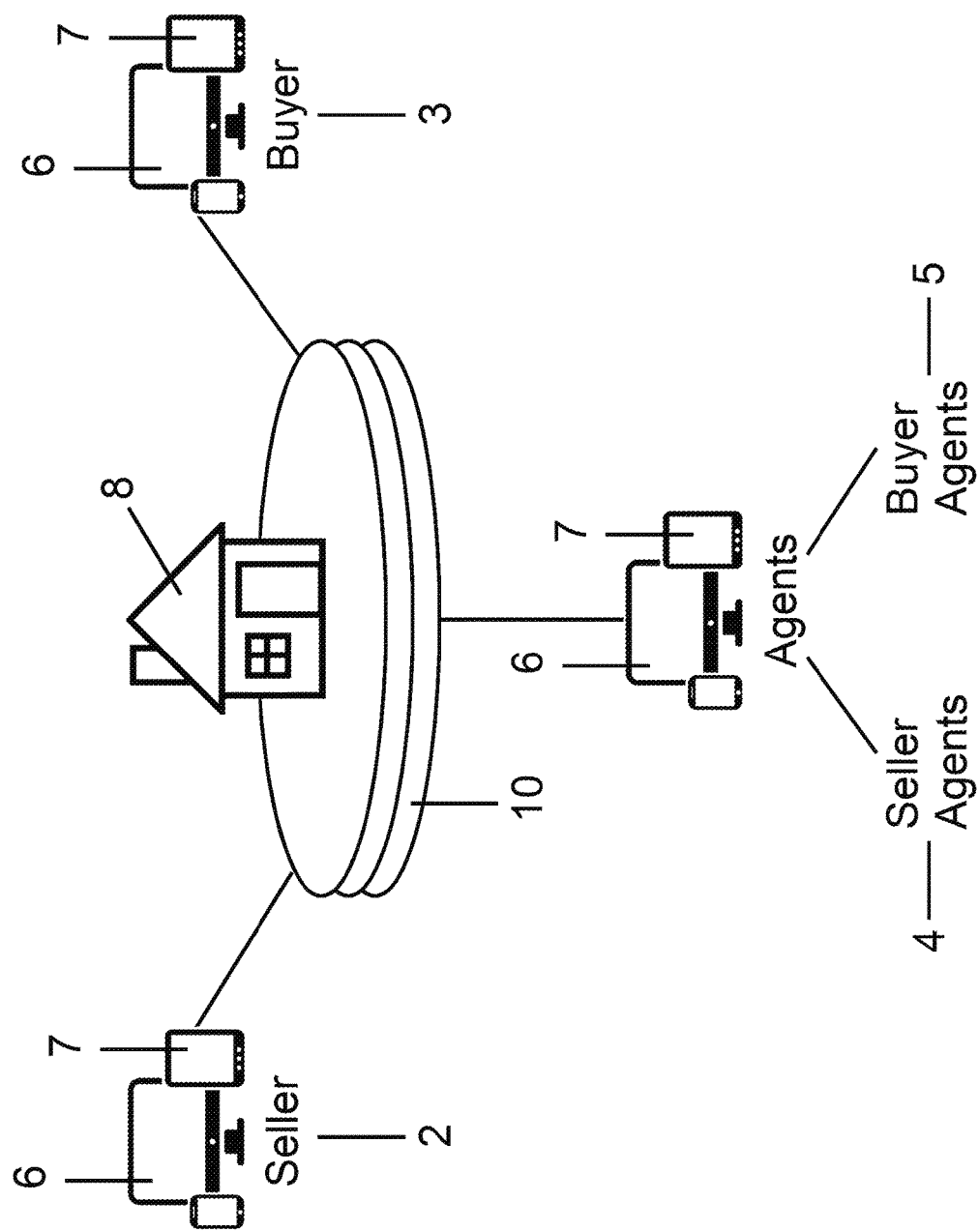
FIG. 1 is a schematic diagram according to an exemplary embodiment of the present invention.

Broadly, embodiments of the present disclosure generally relate to a system (or platform) that facilitates and/or assists real estate transactions between buyers and sellers. In one embodiment, as shown by FIG. 1, a system server 10 is disclosed comprising a non-transitory non-volatile computer-readable storage device including instructions, which when executed by a processor of the computing device, cause the computing device to: receive registration information from a plurality of users via a website 6 or a mobile application 7, where the plurality of users comprises at least buyers, sellers and agents for real estates; receive selling information of a real estate 8 from a seller 2 or the seller's agent 4 from the website 6 or the mobile application 7; display the selling information to the plurality of users who enter search information that matches the real estate via the website 6 or the mobile application 7, or cause the selling information to be displayed on other websites, where the selling information includes a message or a logo (e.g., "Offer Watch Live" or "OWL") to indicate that any offer for the real estate 8 can only be submitted through the website 6 or the mobile application 7 or both; receive an offer from a buyer 3 or the buyer's agent 5 via the website 6 or the mobile application 7; send a notification to the seller 2 and seller's agent 4 instantly and simultaneously about the offer through the website 6 or the mobile application 7 or both; receive acceptance for the offer or a counteroffer from the seller 2 or seller's agent 4; and establish direction connection between the seller 2 or the seller's agent 4 with the buyer 3 or the buyer's agent 5, allow them to communicate to each other through the website 6 or the mobile application 7. The instructions may further cause the computing device to establish a live chat between the seller or the buyer and a third party including inspectors, escrow officers, loan agents, mortgage broker, bank financiers, and contractors.

FIGS. 2 and 3 are exemplary user interface showing login and sign up screen for the mobile application according to one embodiment of the present disclosure. Similar login and sign up screen can be applied on the website as well. Here, when a user launches the mobile application, the initial screen asks the user whether the user wants to login or register for new account. If the user selects to register the new account, the mobile application will ask the user to provide personal and contact information such as name, email address, password and optionally agent ID if the user is a registered agent. If the user already has an account, the mobile application simply prompts the user to enter login information (i.e., username and password).

Figure 4:
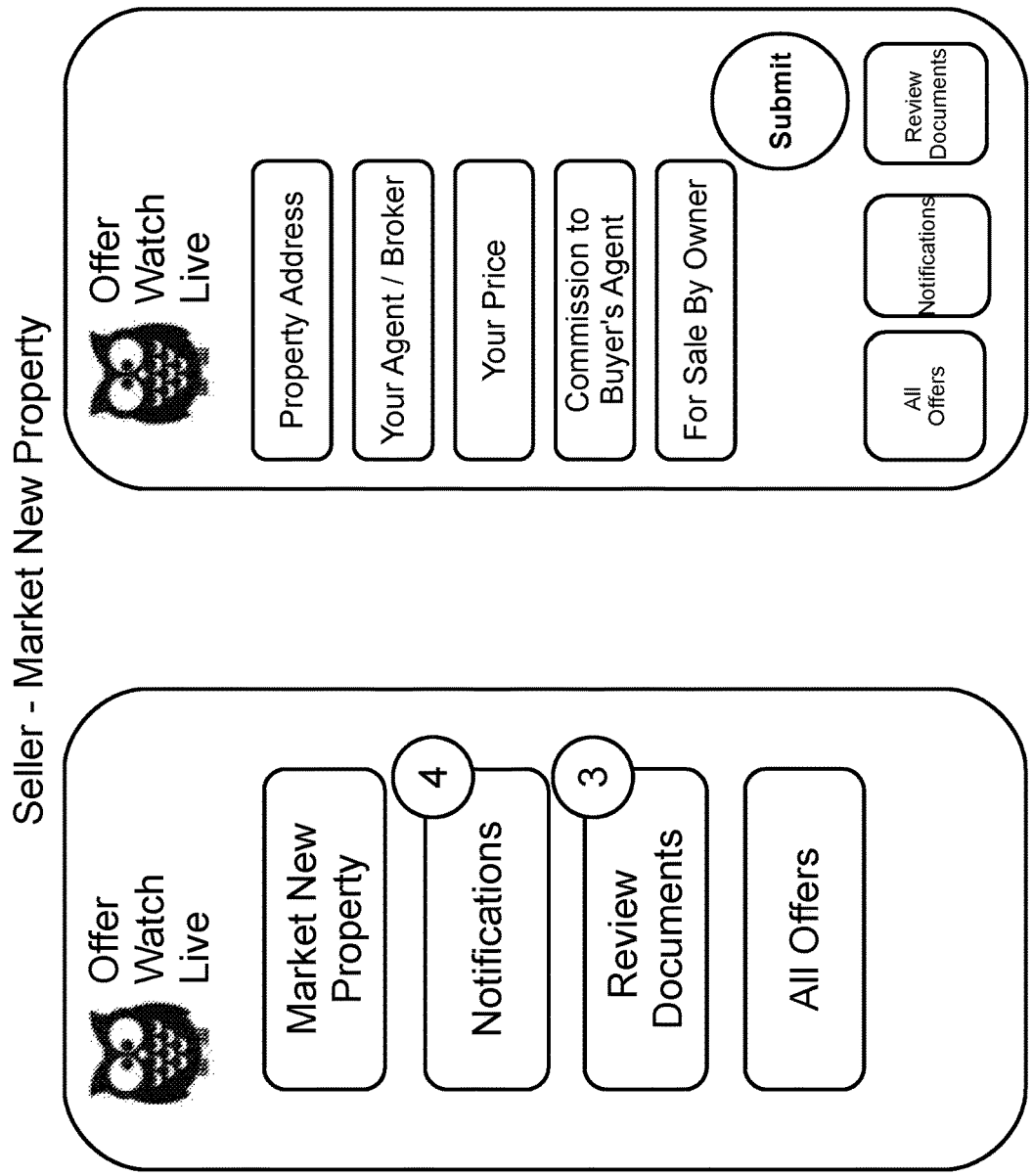
FIG. 4 is a schematic diagram according to an exemplary embodiment of the present invention.
Figure 6:
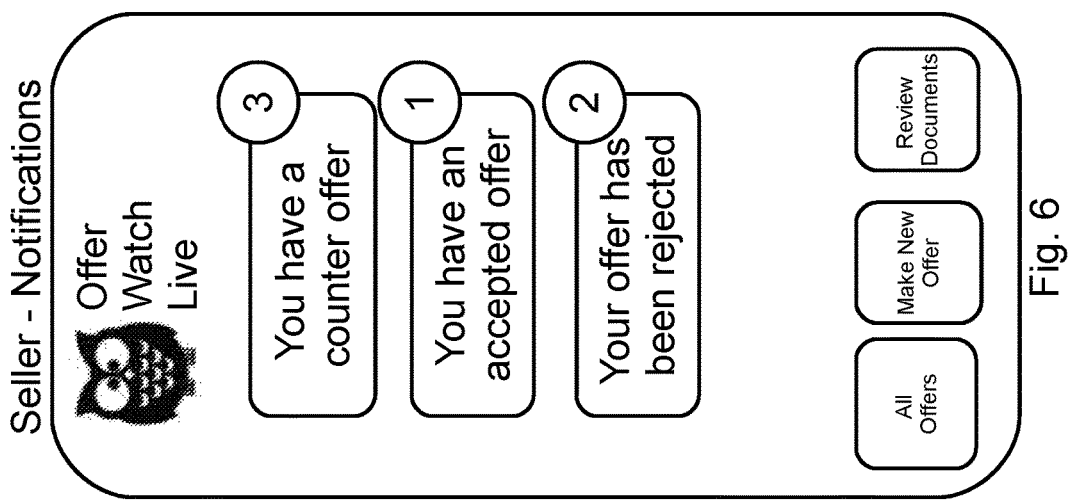
FIG. 6 is a schematic diagram according to an exemplary embodiment of the present invention.
Figure 8:
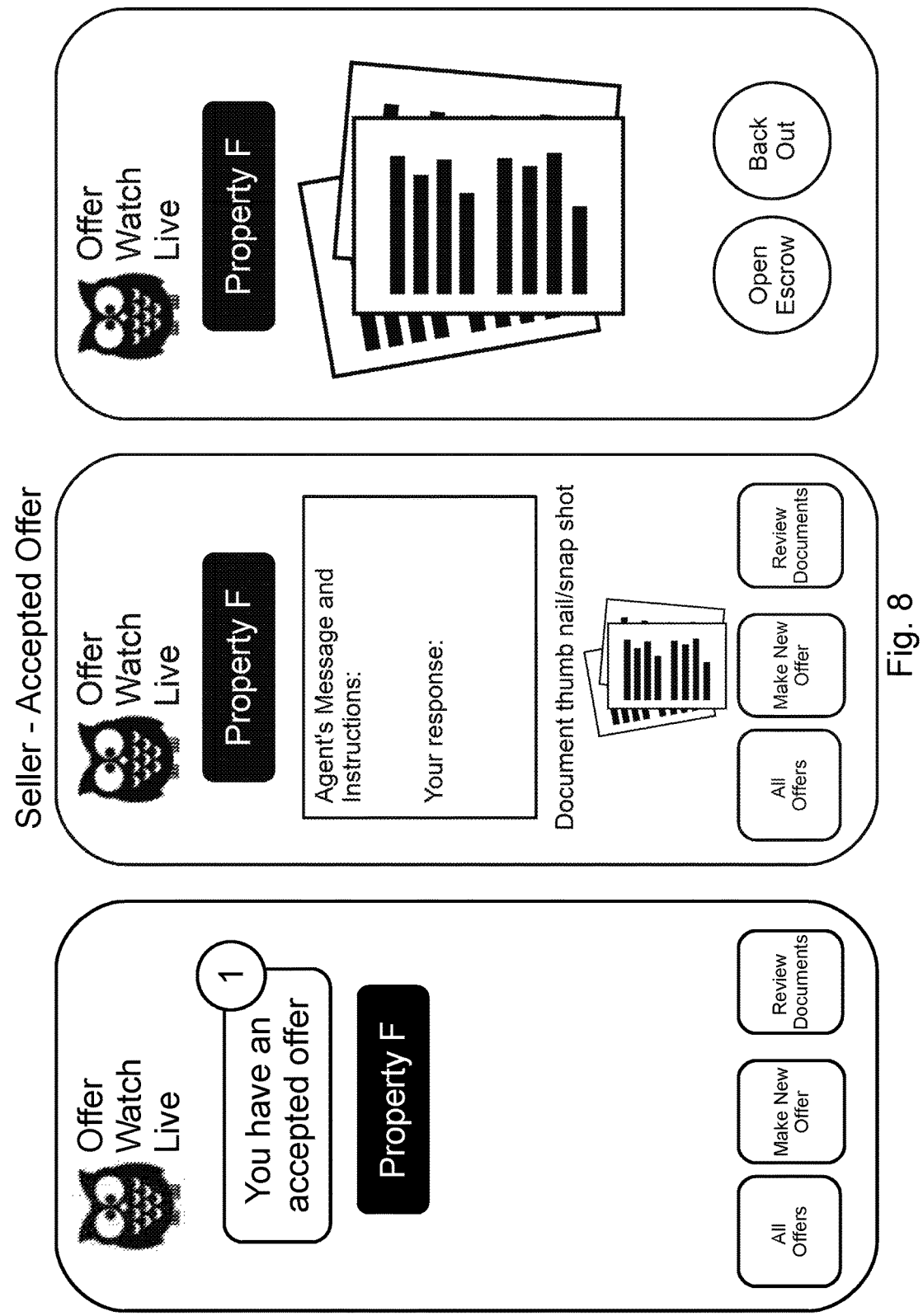
FIG. 8 is a schematic diagram according to an exemplary embodiment of the present invention.
Figure 9:
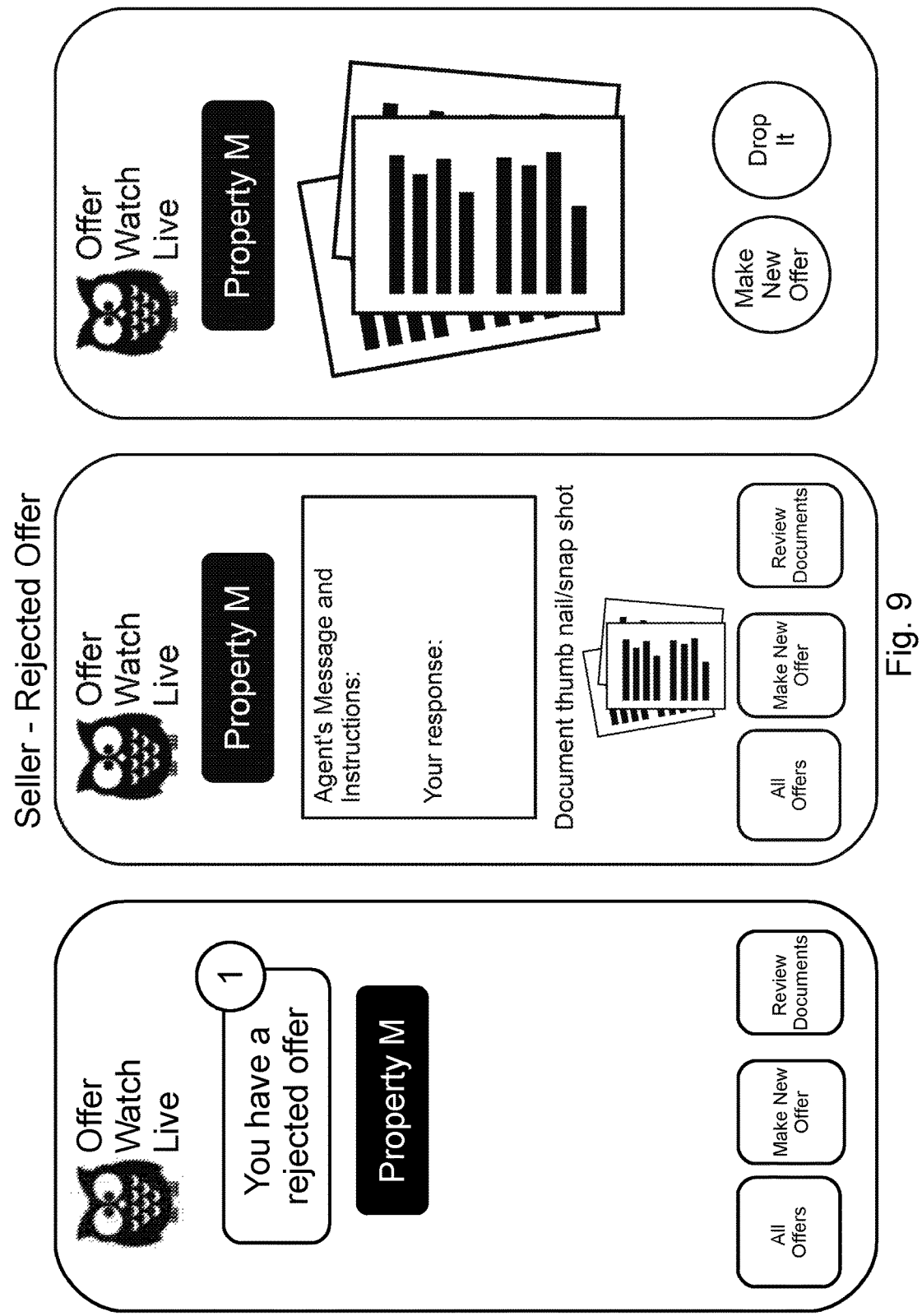
FIG. 9 is a schematic diagram according to an exemplary embodiment of the present invention.
Figure 10:
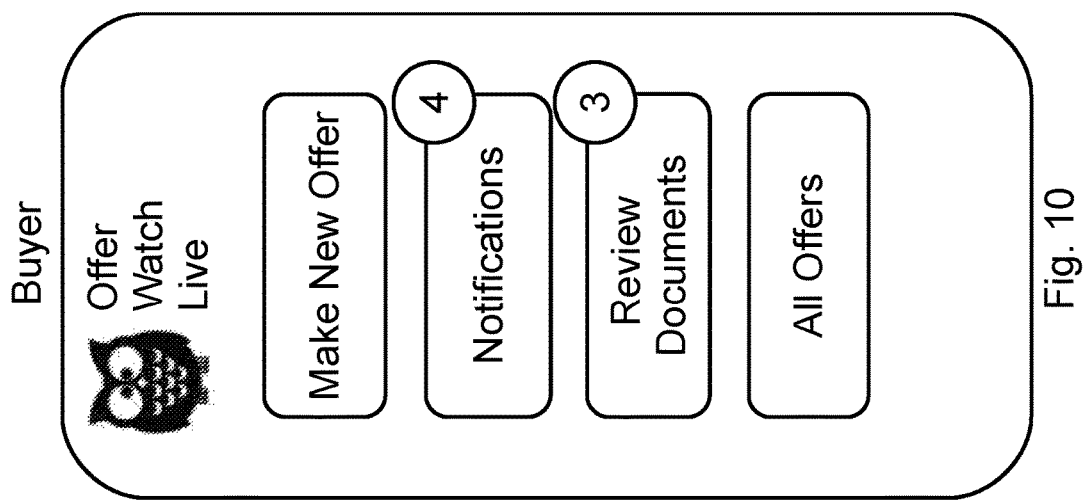
FIG. 10 is a schematic diagram according to an exemplary embodiment of the present invention.
Figure 11:
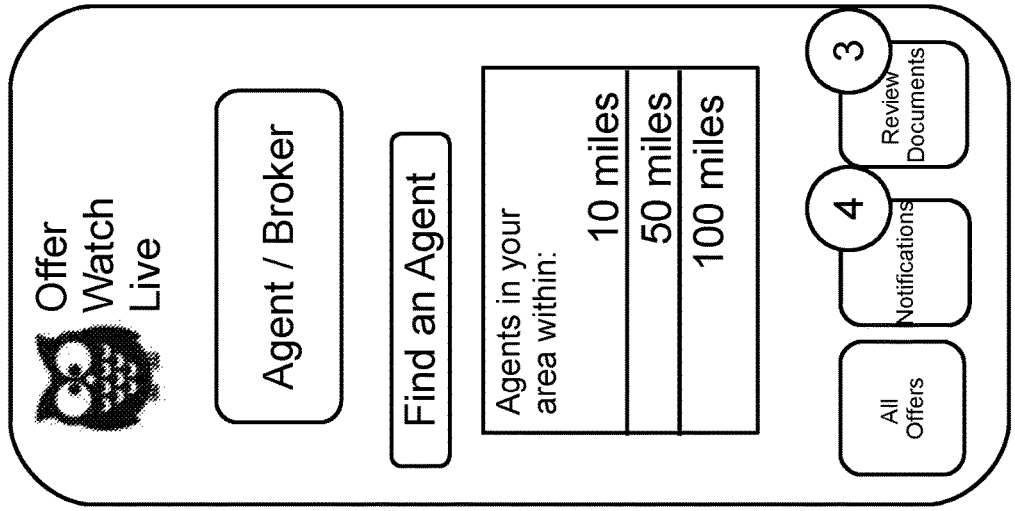
FIG. 11 is a schematic diagram according to an exemplary embodiment of the present invention.
Figure 12:
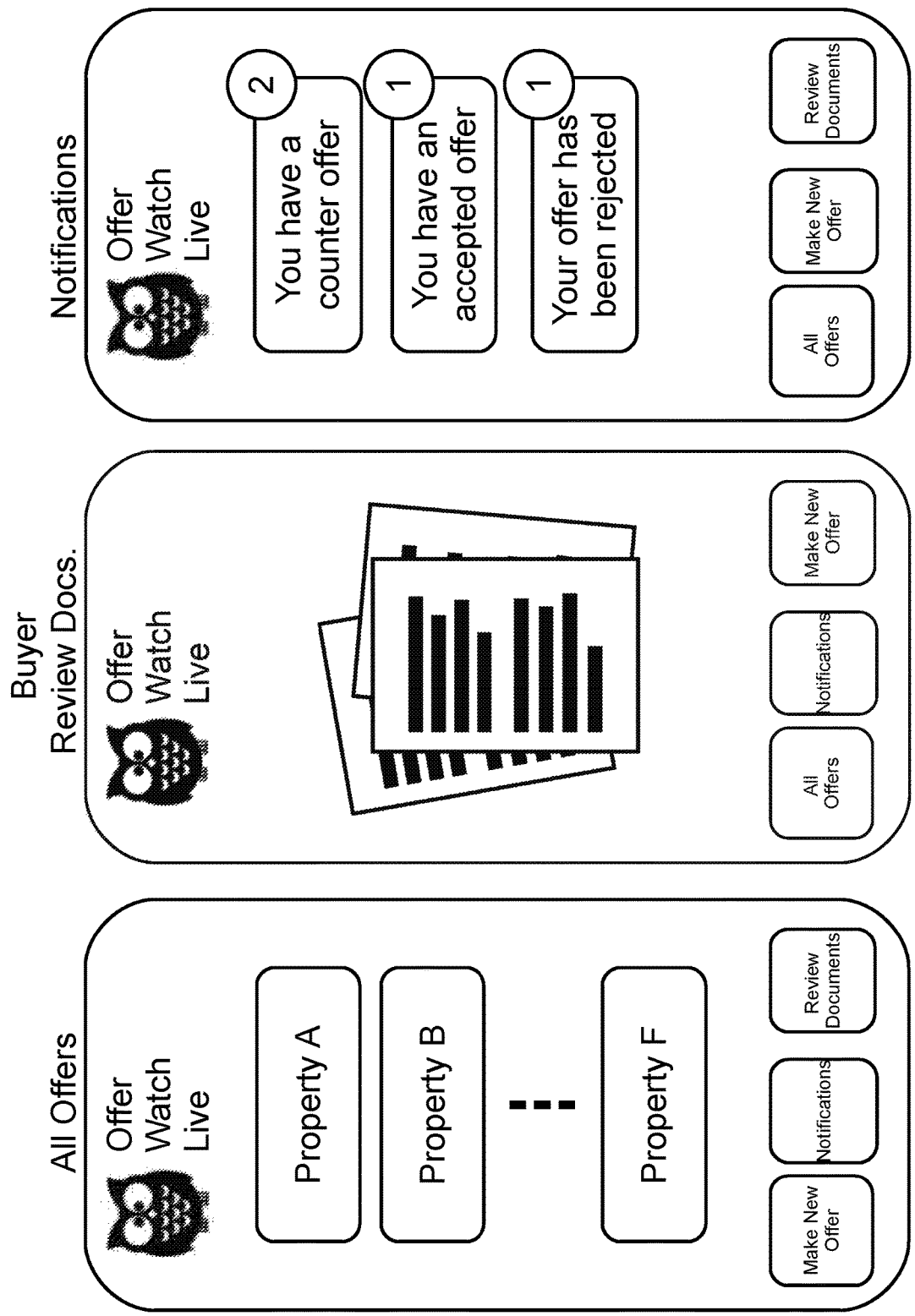
FIG. 12 is a schematic diagram according to an exemplary embodiment of the present invention.
Figure 14:
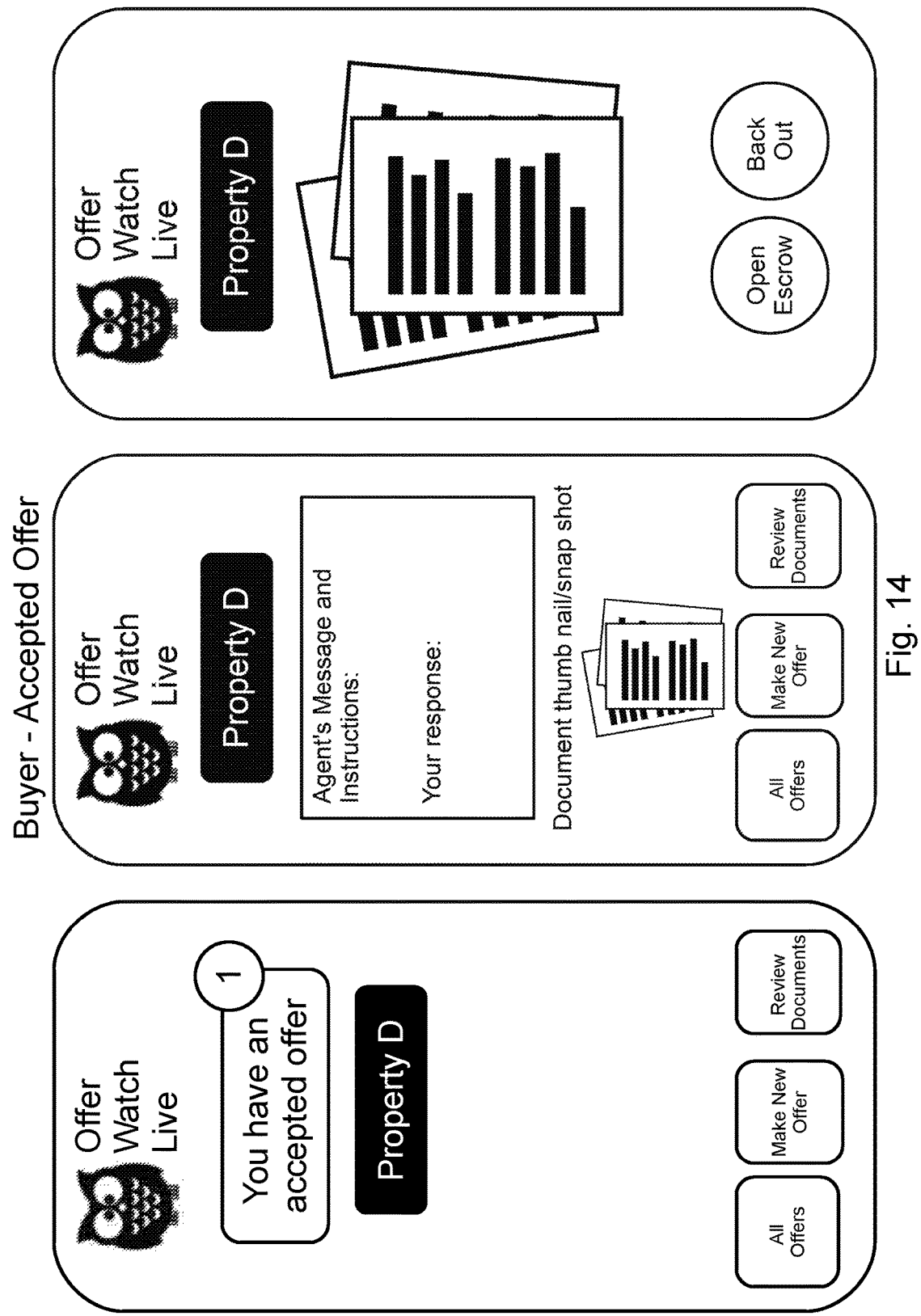
FIG. 14 is a schematic diagram according to an exemplary embodiment of the present invention.
Figure 15:
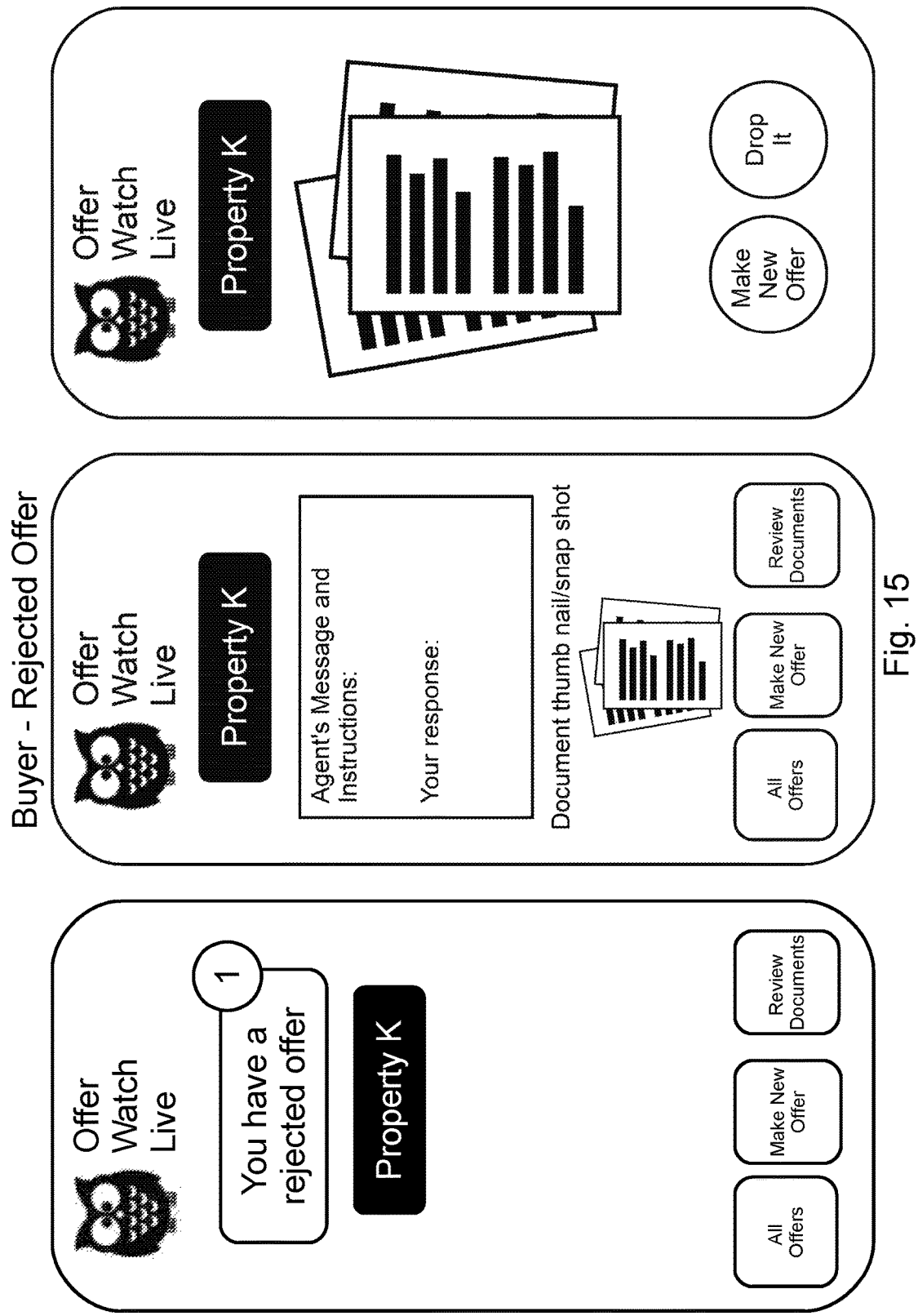
FIG. 15 is a schematic diagram according to an exemplary embodiment of the present invention.
Figure 16:
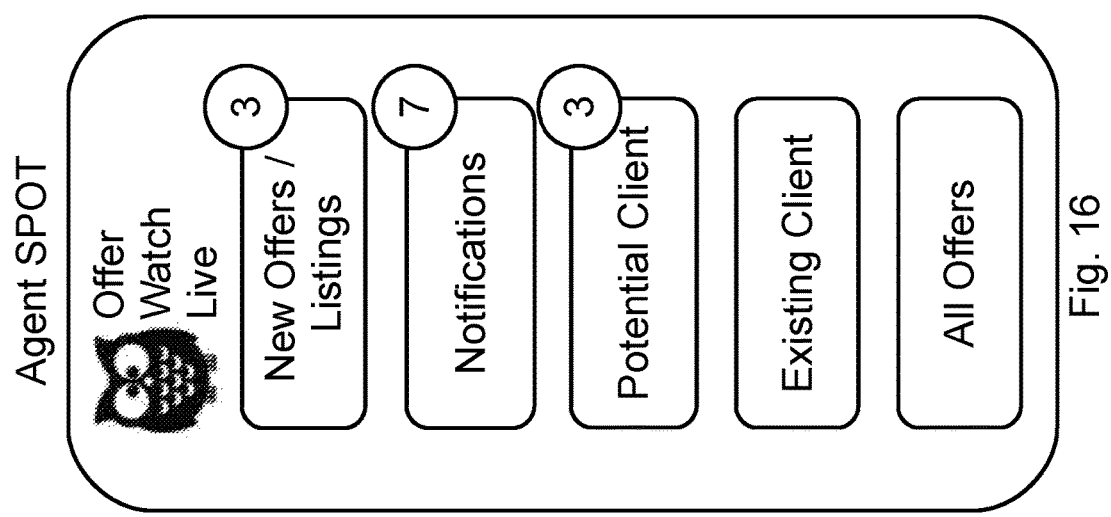
FIG. 16 is a schematic diagram according to an exemplary embodiment of the present invention.

FIGS. 4 to 15 are exemplary user interface for buyers and sellers. Similar user interface also applies to the website as well. As shown by FIG. 4, the seller can market the new property through the mobile application. The mobile application will ask the seller to provide selling information such as property address, agent, price, commission to buyer's agent etc. The selling information can also be provided by seller's agent if seller has appointed one. However, as shown by FIG. 5, if the seller 2 or the buyer 3 does not have an agent and desires to have one, the system server 10 also provides the seller 2 and the buyer 3 with a list of available agents depending on the seller 2 or the buyer's 3 searching criteria. For example, the searching criteria may include, but are not limited to, geographic distance between buyer/seller and the agents, terms and conditions of the agents, and commission schedule for the agents.

Once the seller receives a counteroffer, accepted offer and/or offer rejection etc., the system will immediately notify the seller as shown in FIGS. 6 to 9. The mobile application may include shortcut buttons on top and/or bottom of the application screen to allow user to quickly access or switch between different section of the mobile application. When the seller selects counteroffer, accepted offer and/or offer rejection in the menu, the mobile application will display corresponding screen and provide more detailed information. Here, the system also allows the seller to establish direct communication with buyer or buyer's agent to directly discuss the counteroffer. If required, the system will generate required document or transmit document submit by the parties (e.g., counteroffer) to each other, and allow the parties to sign the necessary documents online using authorized online signature systems (e.g., DocuSign®). FIGS. 10 to 15 are exemplary user interface for buyers which are identical to the sellers.

In yet another embodiment of the disclosure, if the seller is a company or partnership that has more than one partners or operating officers (i.e., general manager and executive members etc.), all offers, counteroffers, purchasing/leasing agreements, and/or any other important messages will be directed to all the partners and operating officers. The user(s) may also select specified partner(s) or operating officer(s) that can receive the notification. Since making all or some of the partners or operating officers to aware about all the incoming offers, counteroffers and/or purchasing/leasing agreements will require all partners and operating officers to use the disclosed application to achieve this goal, the requirement to use the disclosed application may be stated in their contract or operating agreement in advance to achieve this.

Figure 17:
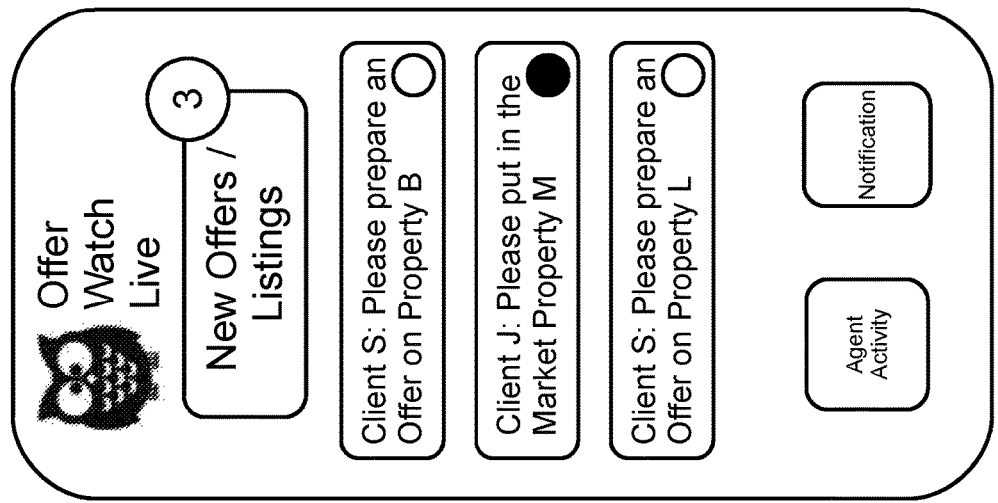
FIG. 17 is a schematic diagram according to an exemplary embodiment of the present invention.
Figure 18:
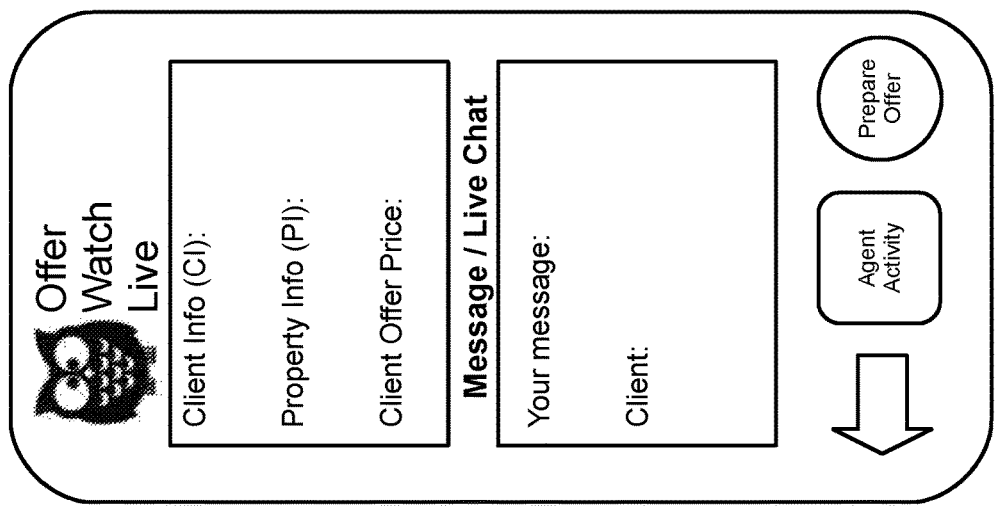
FIG. 18 is a schematic diagram according to an exemplary embodiment of the present invention.
Figure 19:
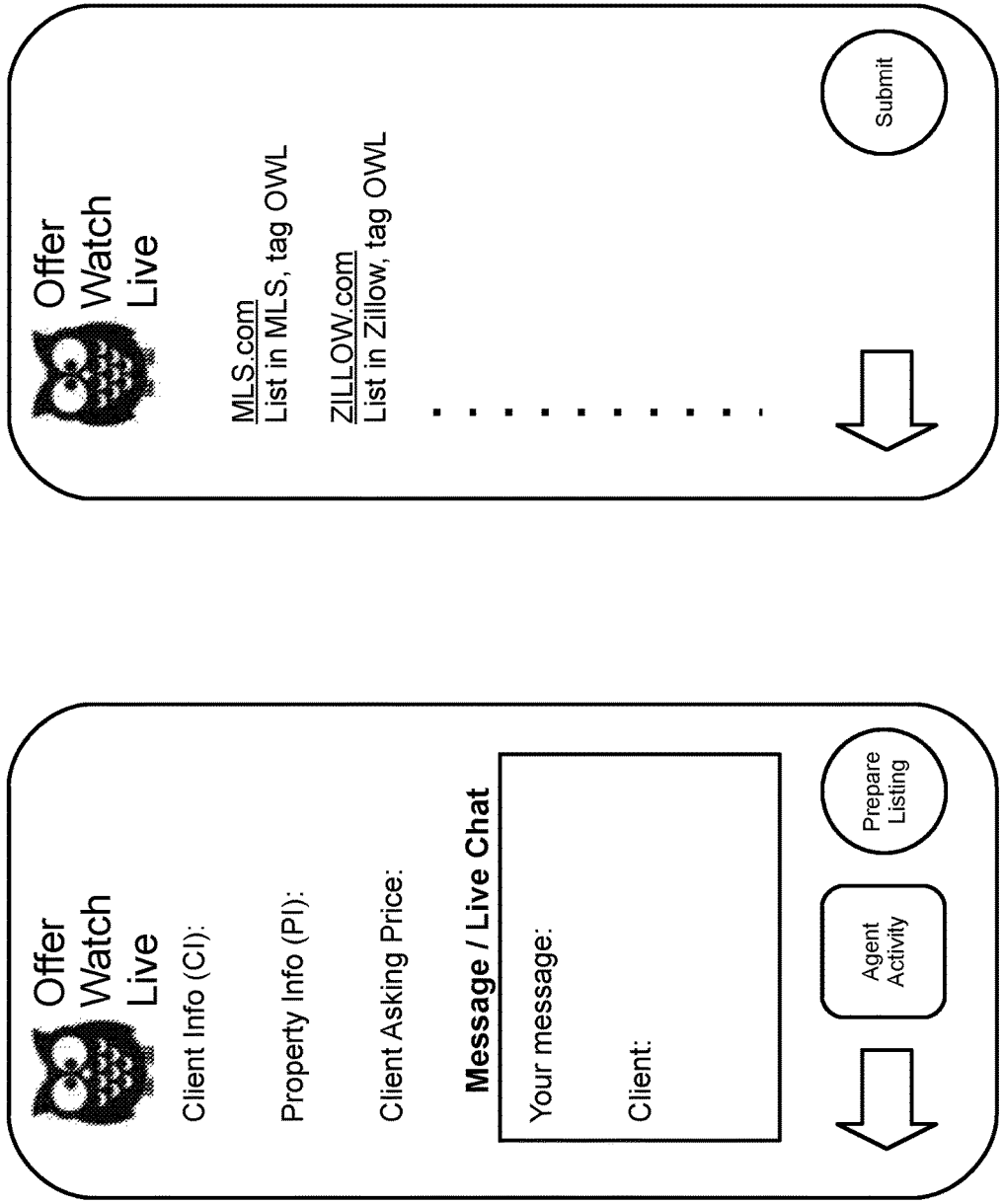
FIG. 19 is a schematic diagram according to an exemplary embodiment of the present invention.
Figure 20:
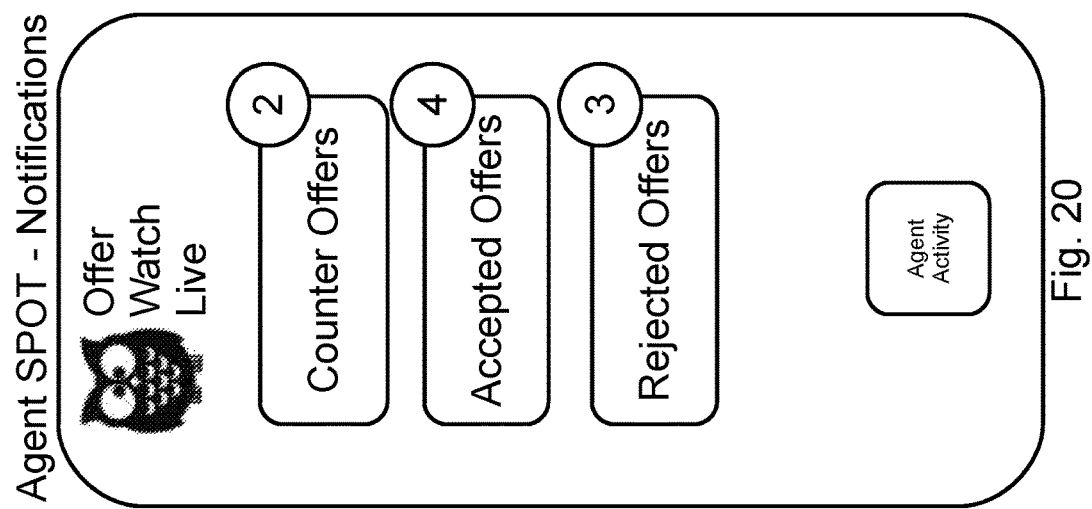
FIG. 20 is a schematic diagram according to an exemplary embodiment of the present invention.
Figure 21:
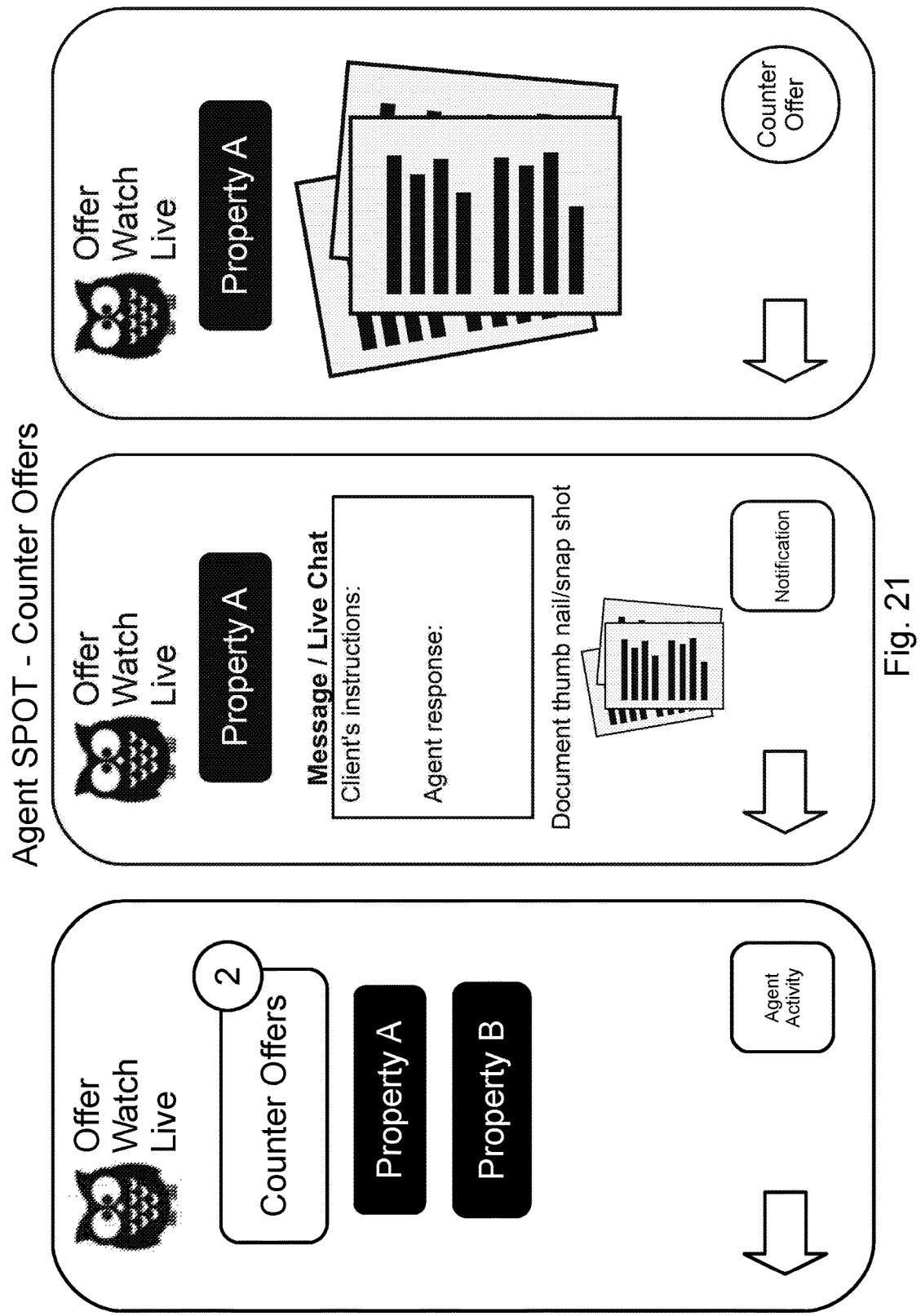
FIG. 21 is a schematic diagram according to an exemplary embodiment of the present invention.
Figure 22:
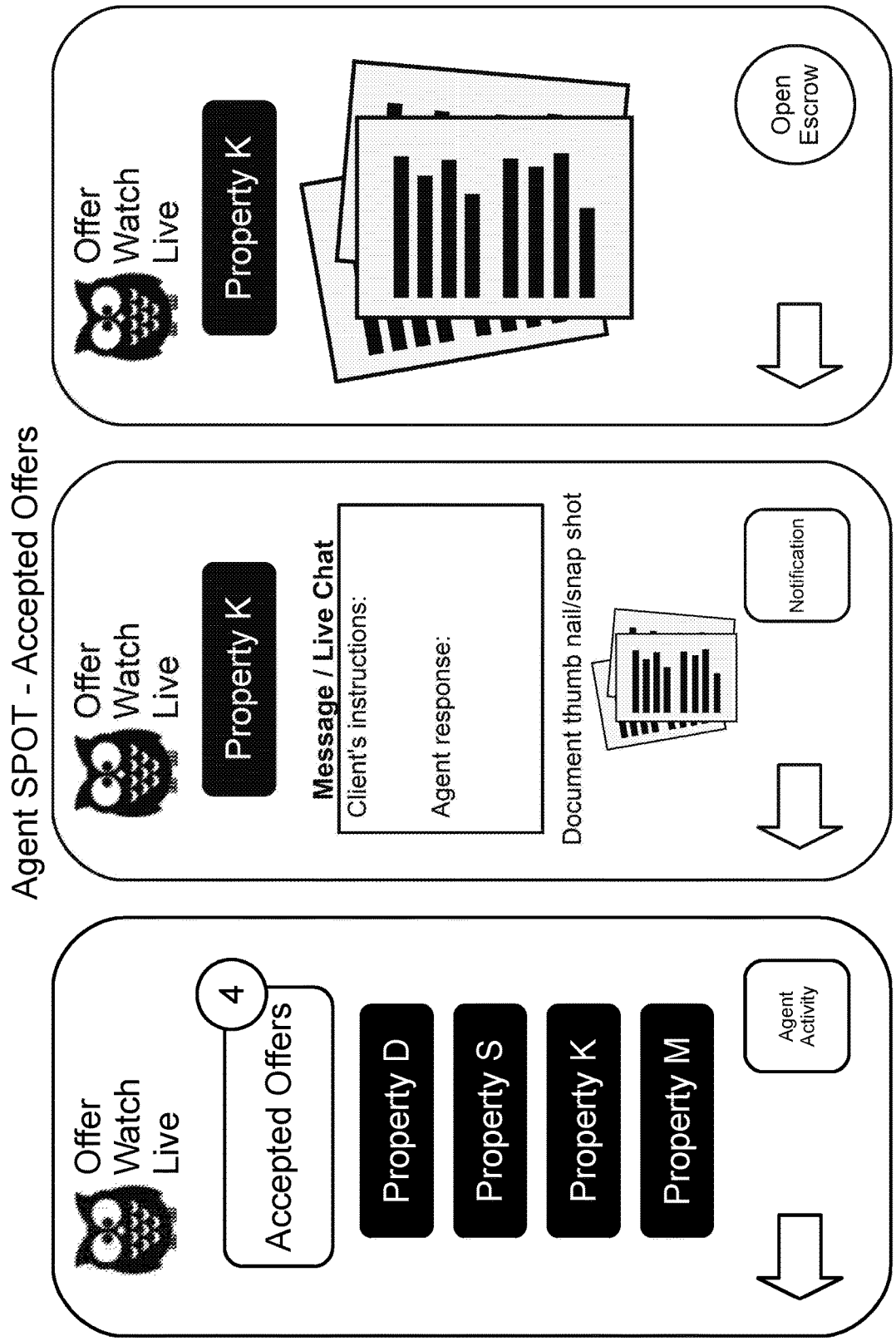
FIG. 22 is a schematic diagram according to an exemplary embodiment of the present invention.
Figure 23:
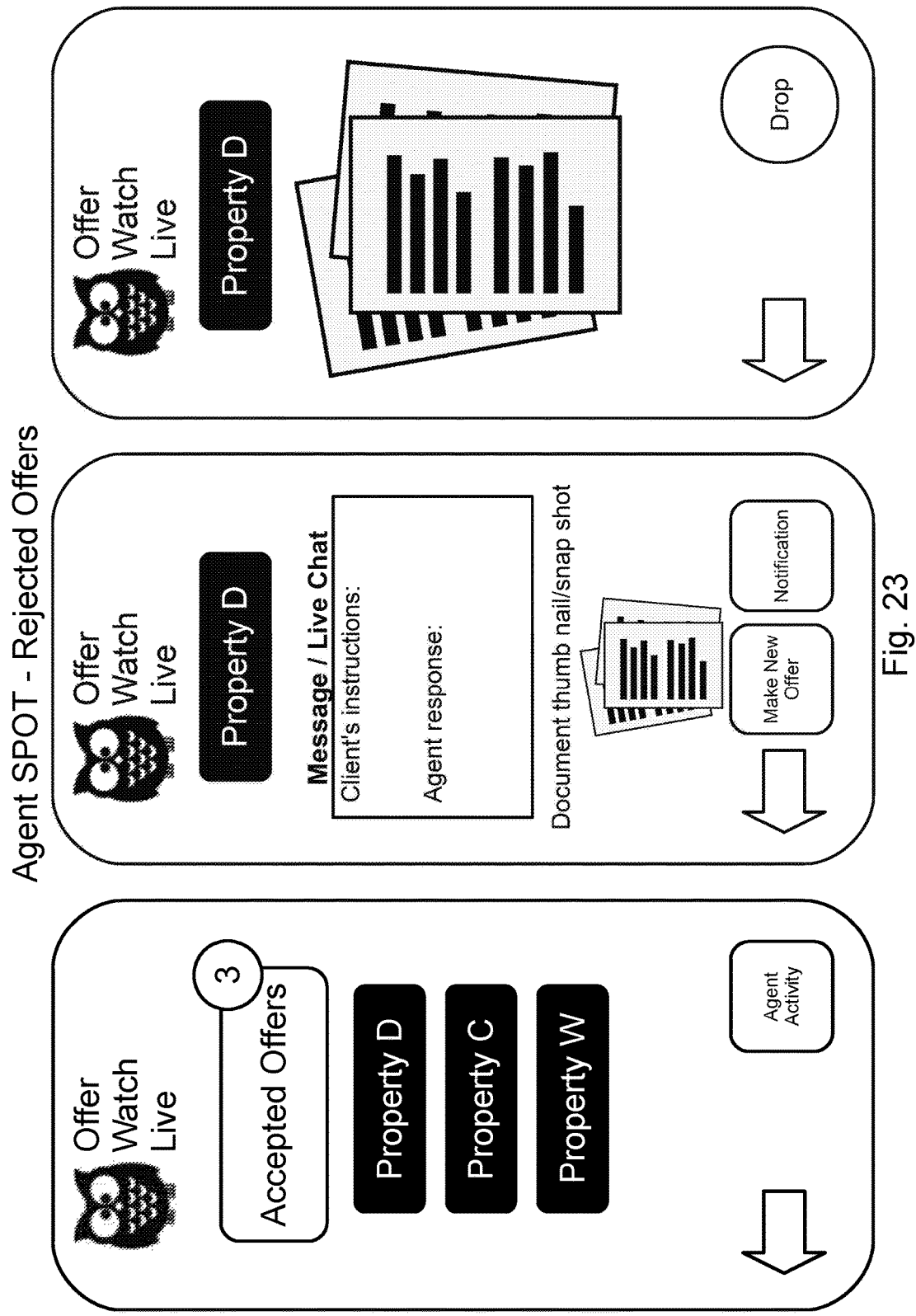
FIG. 23 is a schematic diagram according to an exemplary embodiment of the present invention.
Figure 24:
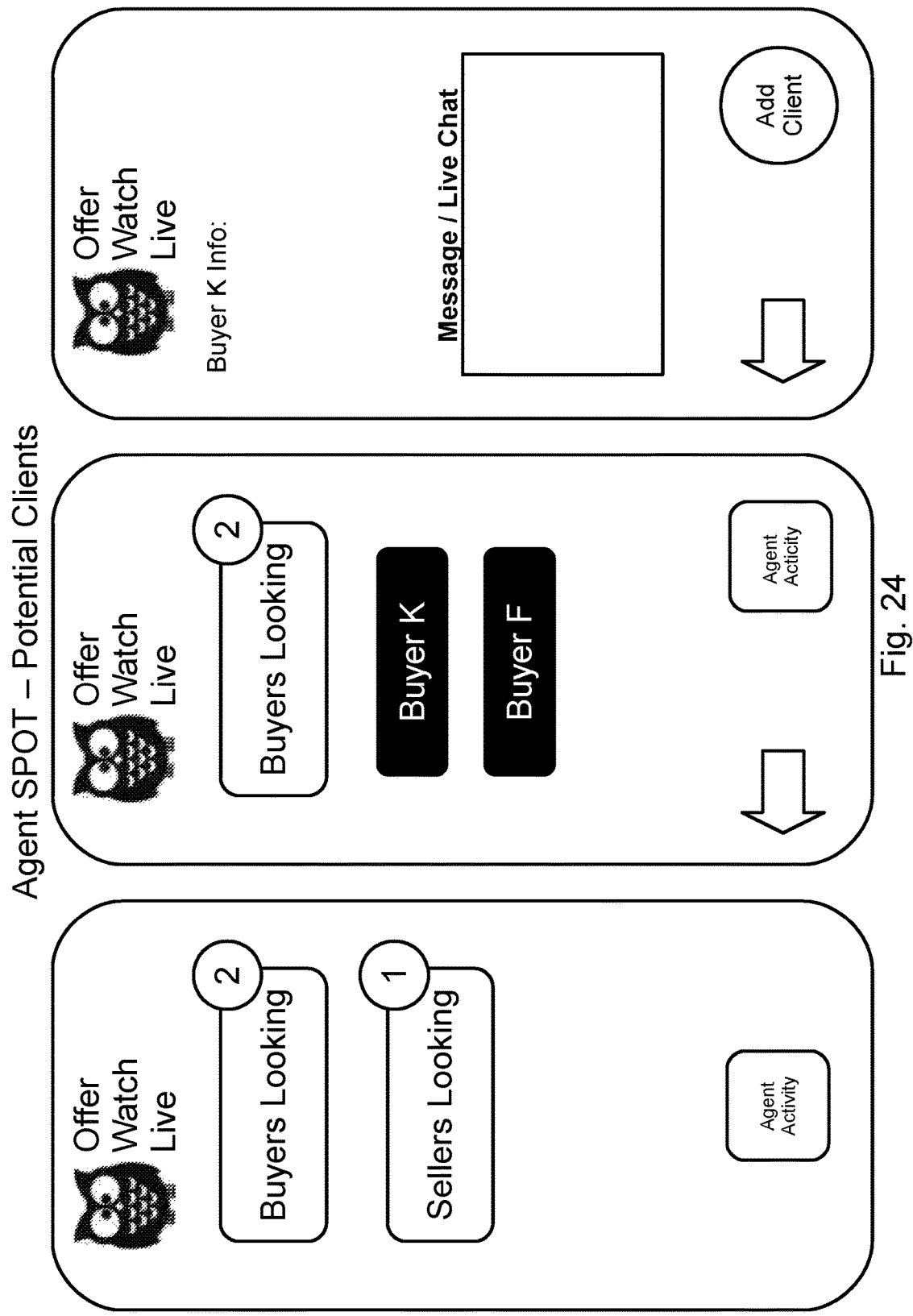
FIG. 24 is a schematic diagram according to an exemplary embodiment of the present invention.
Figure 25:
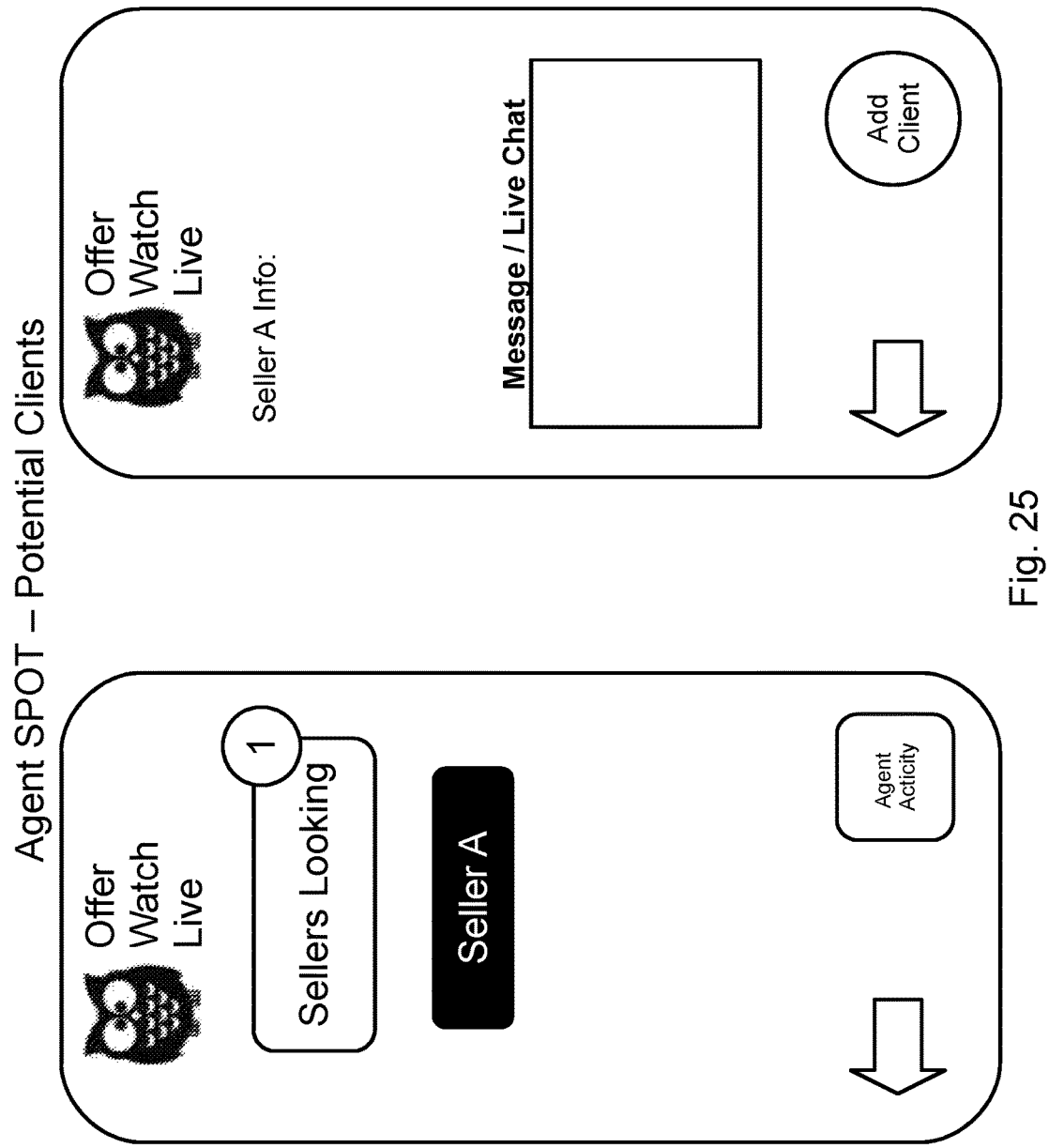
FIG. 25 is a schematic diagram according to an exemplary embodiment of the present invention.
Figure 26:
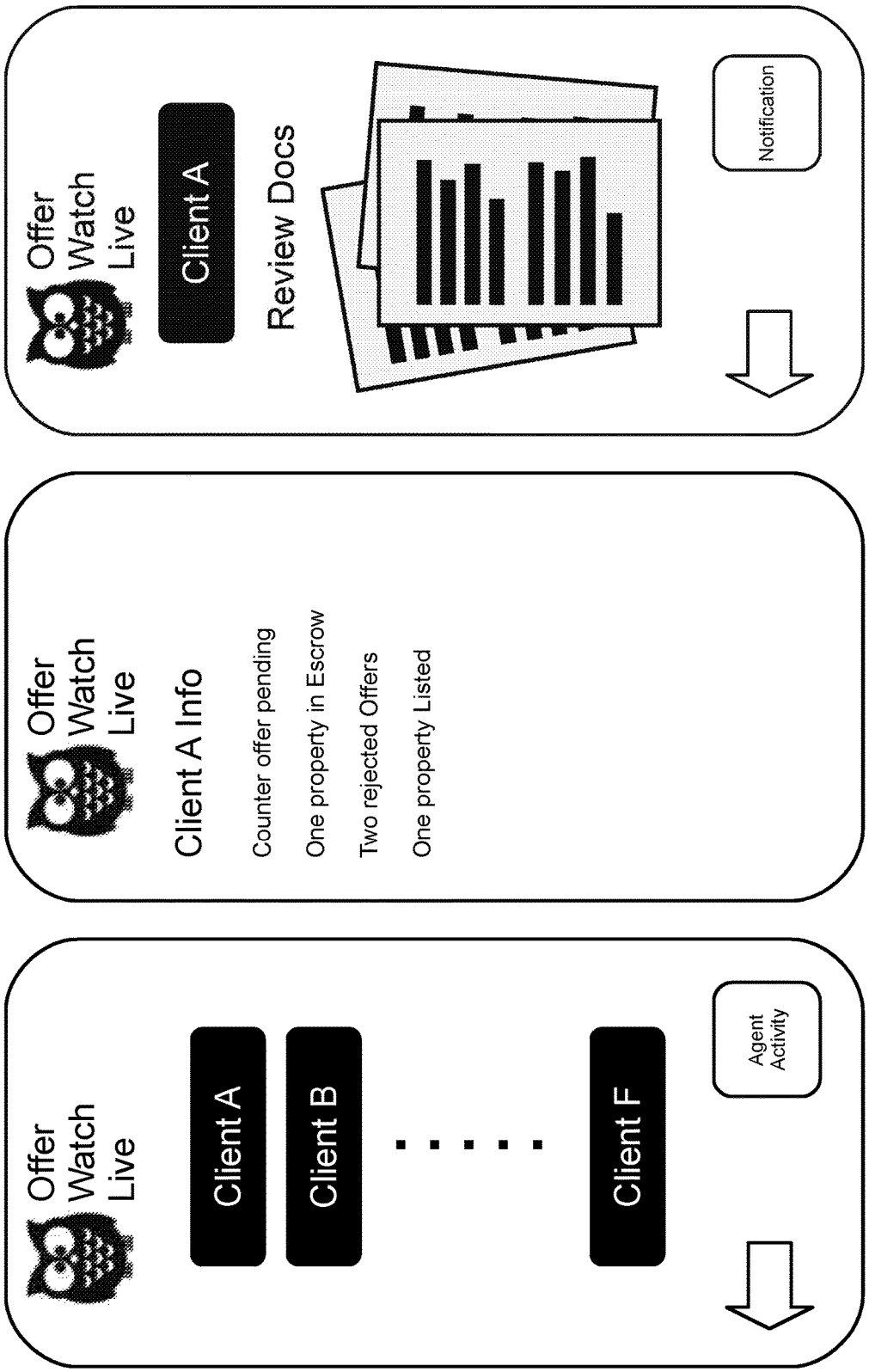
FIG. 26 is a schematic diagram according to an exemplary embodiment of the present invention.

FIGS. 16 to 26 are exemplary user screen for agents (for both buyers and sellers' agents). The mobile application allows sellers to request agents to put their property on the market or to prepare documents for them as shown by FIG. 17. If agents have any questions, they can always connect to the interested party via Message/Live Chat as shown by FIG. 18. The mobile application further allows the agent to upload their listings to third party websites (e.g., MLS® and Zillow® etc.). Like buyers and sellers' user screen, the agents also have access to notification screen where they can view all the incoming notifications as shown by FIGS. 20 to 23, and prepare, review and/or sign documents required. The mobile application further allows agents to search for potential clients by listing out users who are looking for agents as shown by FIGS. 24 and 25. Once agents are retained by clients, clients' profile can be accessed through the mobile application as shown by FIG. 26.

In one embodiment of the present disclosure, the disclosed system can generate standard documents required for real estate transactions, and delivers them to the users. The system also provide means (e.g., DocuSign®) for the users to view and sign documents electronically through the website and/or the mobile application.

In yet another embodiment of the present disclosure, the system also serves as a platform for listing properties like conventional real estate websites (e.g., MLS®, Zillows® etc.). The platform provides general and specific search of real estate properties based on the criteria input by the user (e.g., price, geographic area, house condition etc.).

In another embodiment of the present disclosure, the notification is an animated image displaying on the website or the mobile application with a sound. For example, as shown by FIG. 2, the animated image can be an owl turning its head and making owl's sound. It can also be an owl flying, hooting, flapping wings and/or jumping. The mobile application is installed and executes on a mobile device that includes smartphone and tablet. Further, each user may be given an option to customize his or her notification, especially for the chat. For instance, the user can have an option to create a custom look for his or her owl such as changing the eye color or feather color, using items such as glasses on the face of owl, and changing different species of owl and sounds associated with the owl.

In yet another embodiment of the present disclosure, the website and the mobile application use color coding in making distinction between different users, statuses, functions and stages of negotiations, as well as notifications. The following describes this facet of the system which is specifically designed to maximize user experience and functionality. For examples, color coding used in the system can be as following:

BROWN—all system functions and notifications;
YELLOW—Buyers and their functions;
PURPLE—Sellers and their functions;
GRAY—Agents and their functions;
BLUE—counter offer status;
GREEN—accepted offer;
RED—rejected offer;
GREY-YELLOW—a function button that represent an action by the agent on the buyer's behalf;
GREY-PURPLE—a function button that represent an action by the agent on the seller's behalf;
GREY-BROWN—a system function initiated by the agent.

In summary, the disclosed system includes, but is not limited to, the following advantages for sellers, buyers and agents.

Sellers:
1) Sellers will get an immediate live notification, as soon as a buyer indicates an interest in their property;
2) Sellers will get a notification as soon as an offer has been made on their property;
3) Sellers will have access to Live Chat and messaging with all corresponding parties including but not limited to agents, buyers, inspectors and escrow officers;
4) Sellers are able to look at all their activity including but not limited to all offers with their history and status, keep a history of all documents and messages generated related to each property's activities;
5) Sellers can compare their multiple offers and make more informed decision more efficiently and through a user friendly interface;
6) Sellers can use "Sale By Owner" feature, when decide to eliminate listing agent so the real estate transaction is conducted directly between Sellers and buyers without agents;
7) Sellers can look for an agent or within specified geographic distance and be able to specify their terms and conditions together with commission schedule (through map or notification);
8) Sellers can tap into future resources provided by the app to further facilitate their purpose;
9) Sellers can look for contractors for improvements for their property to be listed, and contractors can reach out to Sellers with their bids. (through map or notifications); and 10) Sellers can look for title company, escrow company, attorney, inspectors, loan agents, mortgage broker, bank financiers and all other service providers (through map or notifications).

Buyers:
1) Buyers will get notifications as soon as any correspondence is made with their agent;
2) Buyers have access to Live Chat (e.g., voice and/or video) and messaging with all corresponding parties;
3) Buyers are able to see a history of all their activities, offer status and all messages and documents generated;
4) Buyers can make sure their offers are represented;
5) Buyers can look for agents and all other service providers within a specified distance, either by using the map or a notification message to the system;
6) Buyers can specify their terms and conditions;
7) Buyers can tap into future resources provided by the app to further facilitate their purpose;
8) Buyers can look for contractors for improvements of the properties they just purchased, and contractors can reach out to buyers with their bids;
9) Buyers can look for title company, escrow company, attorney, loan agents, mortgage broker, bank financiers and inspectors; and
10) Buyers all the above can be done through searching the map.

Agents and Brokerage Firms
1) Agents can list new properties through the app, or tag directly from other listing websites such as MLS® or Zillow®;
2) Agents are aware of their clients activity in real time through direct notifications and are able to act upon those notifications based on the clients instructions;
3) Agents can manage all their activity and keep track of all steps of their negotiations, purchase and sales agreements, all messages and documents generated, status of all offers from initial offer to the end of the escrow;
4) Agents have access to live chat and messaging with their clients and other agents on the other side of the negotiations;
5) Agents can be notified of clients that are searching for agents within a specified distance, and be able to negotiate and proceed with contracts for their sales or purchase agreements; and
6) Agents make offers, counter offers, open escrow.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A computing device comprising a non-transitory non-volatile computer-readable storage device including instructions, which when executed by a processor of the computing device, cause the computing device to:

receive registration information from a plurality of users via a mobile application running on mobile devices, where the plurality of users comprises buyers, sellers and agents for real estates;

receive selling information of a real estate from a seller or the seller's agent via the seller or the seller's agent's mobile device;

display the selling information on the plurality of users' mobile devices when they enter search information that matches the real estate via their mobile devices, or cause the selling information to be displayed on specified websites;

receive an offer for the real estate from a buyer or the buyer's agent via the buyer or the buyer's agent's mobile device;

send a notification to the seller's mobile device and seller's agent's mobile device instantly and simultaneously about the offer;

receive an acceptance for the offer or a counteroffer from the seller or seller's agent via the seller or the seller's agent's mobile device, and send the acceptance or the counteroffer instantly and simultaneously to the buyer's mobile device and buyer's agent's mobile device; and establish a direct communication connection between the seller or the seller's agent's mobile device with the buyer or the buyer's agent's mobile device, enable them to communicate to each other via the mobile application.

2. The computing device of claim 1, wherein the instructions further cause the computing device to generate standard documents required for real estate transactions upon receiving requests from the plurality of users' mobile devices.

3. The computing device of claim 1, wherein the notification comprises an animated image displaying on the seller or the seller's agent's mobile device with a sound.

4. The computing device of claim 3, wherein the animated image comprises owl turning flying, hooting, flapping wings and jumping.

5. The computing device of claim 1, wherein the mobile device is a smartphone or a tablet computer.

6. The computing device of claim 1, wherein the mobile application provide means for the plurality of users to view and sign documents electronically.

7. The computing device of claim 1, wherein the mobile application uses color coding to make color distinction between the buyer, the buyer's agent, the seller and the seller's agent when displaying them on their mobile devices, where stages of negotiations and notifications from the buyer, the buyer's agent, the seller and the seller's agent are also color coded with different colors.

8. The computing device of claim 1, wherein the instructions further cause the computing device to establish a direct communication between the seller or the buyer's mobile device and a third party's mobile device including inspectors, escrow officers, loan agents, mortgage broker, bank financiers and contractors.

9. The computing device of claim 1, wherein the instructions further cause the computing device to display a list of available agents on the buyer or the seller's mobile device based on an agent search criteria provided by the seller or the buyer via the seller or the buyer's mobile device.

10. The computing device of claim 9, wherein the search criteria includes geographic distance between the buyer or the seller and the agents, terms, conditions and commission schedule of the agents.

11. A computing device comprising a non-transitory non-volatile computer-readable storage device including instructions, which when executed by a processor of the computing device, cause the computing device to:

receive registration information from a plurality of users via a website or a mobile application running on mobile devices, where the plurality of users comprises buyers, sellers and agents for real estates;

receive selling information of a real estate from a seller or the seller's agent from the website or the seller or the seller's agent's mobile device;

display the selling information on the plurality of users' mobile devices when they enter search information that matches the real estate via their mobile devices, or cause the selling information to be displayed on specified websites;

receive an offer for the real estate from a buyer or the buyer's agent among the plurality of users via the buyer or the buyer's agent's mobile device;

send a notification to the seller's mobile device and the seller's agent's mobile device instantly and simultaneously alerting the offer;

generate standard documents required for real estate transactions upon receiving request from the buyer, the buyer's agent, the seller or the seller's agent's mobile device, where the mobile application provide means for the buyer, the buyer's agent, the seller or the seller's agent to view and sign the standard documents electronically;

receive acceptance for the offer or a counteroffer from the seller or seller's agent via the seller or the seller's agent's mobile device, and send the acceptance or the counteroffer instantly and simultaneously to the buyer's mobile device and buyer's agent's mobile device; and cause a direct voice communication to be established between the seller or the seller's agent with the buyer or the buyer's agent, enable them to have vocal communication with each other through the mobile application.

12. The computing device of claim 11, wherein the notification includes displaying an animated owl on the buyer, the buyer's agent, the seller, the seller's agent's mobile device.

13. The computing device of claim 11, wherein the mobile application uses color coding to make color distinction between the buyer, the buyer's agent, the seller and the seller's agent when displaying them on their mobile devices, where stages of negotiations and notifications from the buyer, the buyer's agent, the seller and the seller's agent are also color coded with different colors.

14. The computing device of claim 11, wherein the instructions further cause the computing device to establish a live voice or video chat between the seller or the buyer's mobile device and a third party's mobile device where the third party includes inspectors, escrow officers, loan agents, mortgage broker, bank financiers and contractors.

15. The computing device of claim 11, wherein the instructions further cause the computing device to display a list of available agents on the buyer or the seller's mobile device based on an agent search criteria provided by the seller or the buyer via the seller or the buyer's mobile device.

16. A computing device comprising a non-transitory non-volatile computer-readable storage device including instructions, which when executed by a processor of the computing device, cause the computing device to:

receive registration information from a plurality of users via a website or a mobile application running on mobile devices, where the plurality of users comprises buyers, sellers and agents for real estates;

display a list of available agents on a buyer or the seller's mobile device based on an agent search criteria provided by the buyer or the seller via the mobile device, where the buyer or the seller can select an agent from the list representing the buyer or the seller, and wherein the search criteria includes geographic distance between the buyer or the seller and the agents, terms, conditions and commission schedule of the agents;

receive selling information of a real estate from a seller or the seller's agent among the plurality of users from the website or the seller or the seller's agent's mobile device;

display the selling information on the plurality of users' mobile devices when they enter search information that matches the real estate via their mobile devices, or cause the selling information to be displayed on specified websites;

receive an offer for the real estate from a buyer or the buyer's agent via the website or the buyer or the buyer's agent's mobile device;

send a notification instantly and simultaneously to both the seller's mobile device and the seller's agent's mobile device notifying the seller and the seller's agent regarding the offer, wherein the notification comprises an animated owl with sound effects;

generate standard documents required for real estate transactions upon receiving request from the buyer, the buyer's agent, the seller or the seller's agent's mobile device, where the mobile application provide means for the buyer, the buyer's agent, the seller or the seller's agent to view and sign the standard documents electronically via their mobile devices;

receive acceptance for the offer or a counteroffer from the seller or seller's agent via the seller or the seller's agent's mobile device, and send the acceptance or the counteroffer instantly and simultaneously to the buyer's mobile device and buyer's agent's mobile device;

cause a direct voice communication to be established between the seller or the seller's agent with the buyer or the buyer's agent, enable them to have vocal communication with each other through the mobile application; and cause a live voice or video chat to be established between the seller or the buyer's mobile device and a third party's mobile device where the third party includes inspectors, escrow officers, loan agents, mortgage broker, bank financiers and contractors;

wherein the mobile application uses color coding to make color distinction between the buyer, the buyer's agent, the seller and the seller's agent when displaying them on a map or a chat of their mobile devices, where stages of negotiations and notifications from the buyer, the buyer's agent, the seller and the seller's agent are also color coded with different colors.

17. The computing device of claim 16, wherein the buyer, the buyer's agent, the seller and the seller's agent displaying on the map can be reached through the map's pop up window in the mobile device, where the pop up window further includes options of instant messaging, live voice or video chat, and an in-app notification messaging.

18. The computing device of claim 17, wherein the map displays the plurality of users in different node and color based on their identity, when a user's node is touched on the map, the user's relevant information is displayed on a pop up window.

* * * * *